United States Patent
Nakazawa

(10) Patent No.: US 9,809,126 B2
(45) Date of Patent: *Nov. 7, 2017

(54) VEHICLE-MOUNTED POWER SOURCE APPARATUS

(71) Applicant: Panasonic Intellectual Property Management Co., Ltd., Osaka (JP)

(72) Inventor: Takashi Nakazawa, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 115 days.

This patent is subject to a terminal disclaimer.

(21) Appl. No.: 14/438,760

(22) PCT Filed: Oct. 17, 2013

(86) PCT No.: PCT/JP2013/006169
§ 371 (c)(1),
(2) Date: Apr. 27, 2015

(87) PCT Pub. No.: WO2014/076879
PCT Pub. Date: May 22, 2014

(65) Prior Publication Data
US 2015/0291052 A1    Oct. 15, 2015

(30) Foreign Application Priority Data

Nov. 16, 2012   (JP) .................... 2012-252094

(51) Int. Cl.
*B60L 11/18*    (2006.01)
*B60L 8/00*     (2006.01)
(Continued)

(52) U.S. Cl.
CPC ......... *B60L 11/1868* (2013.01); *B60L 3/0046* (2013.01); *B60L 3/04* (2013.01);
(Continued)

(58) Field of Classification Search
CPC .... H02J 2007/0059; H02J 7/04; H02J 7/1423; H02J 7/35
(Continued)

(56) References Cited

U.S. PATENT DOCUMENTS

| 8,378,623 B2 * | 2/2013 | Kusch ................. | B60L 11/005 320/104 |
| 2006/0092588 A1 * | 5/2006 | Realmuto ............... | H02J 1/10 361/62 |

(Continued)

FOREIGN PATENT DOCUMENTS

| JP | 2007-320352 A | 12/2007 |
| JP | 2011-501013 A | 1/2011 |

(Continued)

OTHER PUBLICATIONS

International Search Report for Application No. PCT/JP2013/006169 dated Jan. 21, 2014.

*Primary Examiner* — Edward Tso
(74) *Attorney, Agent, or Firm* — Pearne & Gordon LLP

(57) ABSTRACT

In the present invention, when charging both a high-voltage battery and a low-voltage battery by means of electrical power obtained by means of solar generation, by means of prioritizing the charging of the low-voltage battery over the charging of the high-voltage battery, a decrease in charging efficiency of the battery overall is suppressed. The vehicle-mounted power source device charges batteries by means of electrical power obtained by means of solar generation. A solar panel converts sunlight into electrical power. A DC/DC boost converter boosts the power converted by the solar panel. A control unit causes switching in a manner so that the high-voltage battery is charged by the electrical power boosted by the DC/DC boost converter when charging the low-voltage battery by means of the power converted by the solar panel and the amount of accumulated electrical power accumulated at the low-voltage battery is at least a predetermined value.

6 Claims, 8 Drawing Sheets

(51) Int. Cl.
- *H02J 7/35* (2006.01)
- *B60R 16/03* (2006.01)
- *H02J 7/00* (2006.01)
- *B60L 3/00* (2006.01)
- *B60L 3/04* (2006.01)

(52) U.S. Cl.
CPC ........... *B60L 8/003* (2013.01); *B60L 11/1805* (2013.01); *B60L 11/1811* (2013.01); *B60R 16/03* (2013.01); *H02J 7/0022* (2013.01); *H02J 7/35* (2013.01); *B60L 2210/14* (2013.01); *B60L 2240/547* (2013.01); *B60L 2240/549* (2013.01); *B60L 2240/80* (2013.01); *Y02T 10/7005* (2013.01); *Y02T 10/7055* (2013.01); *Y02T 10/7066* (2013.01); *Y02T 10/7083* (2013.01); *Y02T 10/7225* (2013.01)

(58) Field of Classification Search
USPC ........ 320/101, 103, 104, 109, 141; 136/291, 136/293
See application file for complete search history.

(56) References Cited

U.S. PATENT DOCUMENTS

| | | |
|---|---|---|
| 2010/0213887 A1 | 8/2010 | Louch et al. |
| 2012/0049772 A1* | 3/2012 | Moussaoui ......... H02M 3/1588 318/376 |
| 2012/0098480 A1* | 4/2012 | David .................... B60L 8/003 320/101 |
| 2012/0133322 A1 | 5/2012 | Walsh et al. |
| 2012/0136534 A1 | 5/2012 | Walsh et al. |
| 2013/0092457 A1 | 4/2013 | Wecker et al. |
| 2013/0169210 A1 | 7/2013 | Louch et al. |
| 2014/0095018 A1* | 4/2014 | Atluri ..................... B60L 1/00 701/36 |
| 2014/0159478 A1 | 6/2014 | Ang |

FOREIGN PATENT DOCUMENTS

| | | |
|---|---|---|
| JP | 2012-056357 A | 3/2012 |
| JP | 2012-056462 A | 3/2012 |
| JP | 2012-075242 A | 4/2012 |
| JP | 2012-515526 A | 7/2012 |
| JP | 2013-74733 A | 4/2013 |
| WO | 2013/030941 A1 | 7/2013 |

* cited by examiner

VEHICLE-MOUNTED POWER SOURCE APPARATUS

TECHNICAL FIELD

The present invention relates to a vehicle-mounted power source apparatus that charges a battery with electrical power obtained by solar power generation.

BACKGROUND ART

In the related art, Patent Literature (hereinafter, referred to as "PTL") 1 discloses a vehicle-mounted power source apparatus that stores the electrical power obtained by solar power generation in a battery. The vehicle-mounted power source apparatus disclosed in PTL 1 simultaneously supplies the electrical power obtained by solar power generation to two low voltage batteries, that is, a main battery and a sub battery. Unlike a high voltage battery that supplies high-voltage (200V) electrical power for the driving of a vehicle, the main battery and the sub battery supply low-voltage (14.0V or 12.5V) electrical power to the load.

In recent years, there has been an increasing demand for a long cruising distance and a short charging time of a high voltage battery in a vehicle that runs on a high voltage battery as a power source, such as an electric automobile. Meanwhile, since the vehicle-mounted power source apparatus disclosed in PTL 1 cannot charge the high voltage battery with electrical power obtained by solar generation, the vehicle-mounted power source apparatus disclosed in PTL 1 cannot sufficiently meet such a demand.

In order to meet such a demand, there has been known a vehicle-mounted power source apparatus which charges the high voltage battery for driving of a vehicle, with electrical power obtained by solar power generation. The vehicle-mounted power source apparatus boosts the voltage of electrical power obtained by solar power generation from a low voltage (for example, 12V) to a high voltage (for example, 200V), and stores the electrical power in the high voltage battery.

CITATION LIST

Patent Literature

PTL 1
Japanese Patent Application Laid-Open No. 2012-56357

SUMMARY OF INVENTION

Technical Problem

However, PTL 1 does not disclose charging both of the low voltage battery and the high voltage battery with electrical power obtained by solar power generation. In a case where both of the low voltage battery and the high voltage battery are simply charged with electrical power obtained by solar power generation, a loss in a booster circuit is large when the booster circuit boosts the voltage of charging electrical power from a low voltage to a high voltage in order to charge the high voltage battery. Thus, the overall charge efficiency of the apparatus decreases.

An object of the present invention is to provide a vehicle-mounted power source apparatus that prevents a decrease in the overall charge efficiency of the apparatus by charging a low voltage battery with prior over charging a high voltage battery when charging both of the low voltage battery and the high voltage battery with electrical power obtained by solar power generation.

Solution to Problem

A vehicle-mounted power source apparatus according to the present invention is a vehicle-mounted power source apparatus that charges a battery with electrical power obtained by solar power generation, the apparatus including: a low voltage battery; a high voltage battery that stores electrical power having a voltage higher than the low voltage battery; a solar panel that converts sunlight into electrical power; a boost section that boosts the voltage of the electrical power obtained through the conversion by the solar panel; and a control section that charges the low voltage battery with the electrical power obtained through the conversion by the solar panel, and that performs switching so as to charge the high voltage battery with the electrical power boosted by the boost section when the amount of electrical power stored in the low voltage battery is equal to or greater than a predetermined value.

Advantageous Effects of Invention

According to the present invention, it is possible to prevent a decrease in the overall charge efficiency of the apparatus by charging a low voltage battery with priority over charging a high voltage battery when charging both of the low voltage battery and the high voltage battery with electrical power obtained by solar power generation.

DESCRIPTION OF EMBODIMENTS

Figure 1:
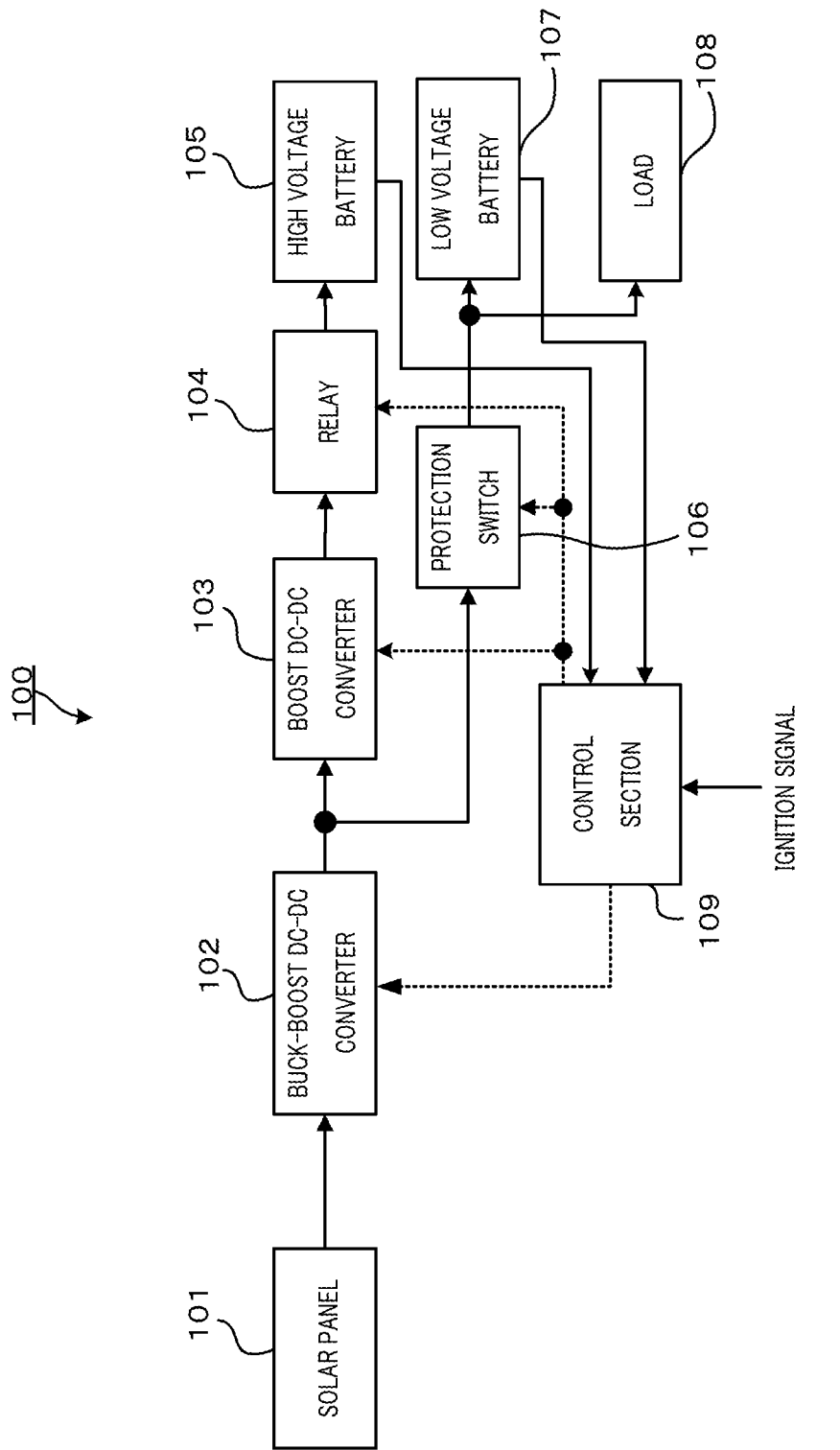
FIG. 1 is a block diagram illustrating the configuration of a vehicle-mounted power source apparatus according to Embodiment 1 of the present invention.

Hereinafter, embodiments will be described in detail with reference to the accompanying drawings.

(Embodiment 1)
<Configuration of Vehicle-Mounted Power Source Apparatus>

The configuration of vehicle-mounted power source apparatus 100 according to Embodiment 1 of the present invention will be described with reference to FIG. 1. In regard to input and output lines in FIG. 1, dotted lines each indicate an input and output line for the transmission of a control signal, and solid lines each indicate an input and output line for the transmission of signals other than the control signal or the delivery of electrical power.

Vehicle-mounted power source apparatus 100 is configured to mainly include solar panel 101; buck-boost DC-DC converter 102; boost DC-DC converter 103; relay 104; high voltage battery 105; protection switch 106; low voltage battery 107; load 108; and control section 109.

Solar panel 101 converts received sunlight into electrical power, and outputs the electrical power to buck-boost DC-DC converter 102.

Buck-boost DC-DC converter 102 stabilizes the voltage value of output electrical power by boosting or bucking the voltage of electrical power received from solar panel 101 according to the control by control section 109. Buck-boost DC-DC converter 102 outputs electrical power having a stabilized voltage value to boost DC-DC converter 103 and protection switch 106.

Boost DC-DC converter 103 boosts the voltage of electrical power from buck-boost DC-DC converter 102 to a predetermined value (for example, 12V to 400V) according to the control by control section 109, and outputs the boosted electrical power to relay 104. At this time, a loss occurs in the electrical power boosted by boost DC-DC converter 103.

Relay 104 switches between ON and OFF states according to the control by control section 109. When relay 104 is turned on, the electrical power received from boost DC-DC converter 103 is output to high voltage battery 105, and in contrast, when relay 104 is turned off, the electrical power from boost DC-DC converter 103 is not output to high voltage battery 105.

High voltage battery 105 stores the high-voltage electrical power that is input from boost DC-DC converter 103 via relay 104.

Protection switch 106 switches between ON and OFF states according to the control by control section 109. When protection switch 106 is turned on, the electrical power from buck-boost DC-DC converter 102 is output to low voltage battery 107, and in contrast, when protection switch 106 is turned off, the electrical power received from buck-boost DC-DC converter 102 is not output to low voltage battery 107.

Low voltage battery 107 stores the low-voltage electrical power that is input from buck-boost DC-DC converter 102 via protection switch 106.

Load 108 operates on the electrical power from protection switch 106 or electrical power stored in low voltage battery 107. Load 108 is an accessory for a vehicle such as a car navigation system.

Control section 109 controls buck-boost DC-DC converter 102 to switch between the turning on and off of a boost operation and a buck operation, and controls boost DC-DC converter 103 to switch between the turning on and off of a boost operation. Control section 109 monitors the amount of electrical power stored in low voltage battery 107, and the amount of electrical power stored in high voltage battery 105. Control section 109 charges low voltage battery 107, based on a monitoring result, and when the amount of electrical power stored in low voltage battery 107 is equal to or greater than a predetermined value, control section 109 controls relay 104 and protection switch 106 to switch between ON and OFF states in such a manner that high voltage battery 105 is charged. That is, control section 109 stores electrical power produced by solar panel 101 in low voltage battery 107 without boosting the electrical power via boost DC-DC converter 103, and when the amount of electrical power stored in low voltage battery 107 is equal to or greater than the predetermined value, control section 109 controls relay 104 and protection switch 106 to switch between ON and OFF states in such a manner that electrical power boosted by boost DC-DC converter 103 is stored in high voltage battery 105. In this manner, vehicle-mounted power source apparatus 100 can prevent a loss from occurring when boost DC-DC converter 103 boosts electrical power produced by solar panel 101. Here, the charging of high voltage battery 105 or low voltage battery 107 implies that high voltage battery 105 or low voltage battery 107 stores electrical power until the amount of electrical power stored therein reaches a predetermined value.

Control section 109 can determine whether the vehicle is traveling or is stopped, based on an ignition signal received from the outside. For example, when the ignition signal to drive a drive section is received, control section 109 determines that the vehicle starts travelling, and then is travelling. When an ignition signal to stop driving the drive section is input, control section 109 determines that the vehicle comes to a stop, and then is stopped.

<Operation of Vehicle-Mounted Power Source Apparatus while Vehicle Stops>

Figure 2:
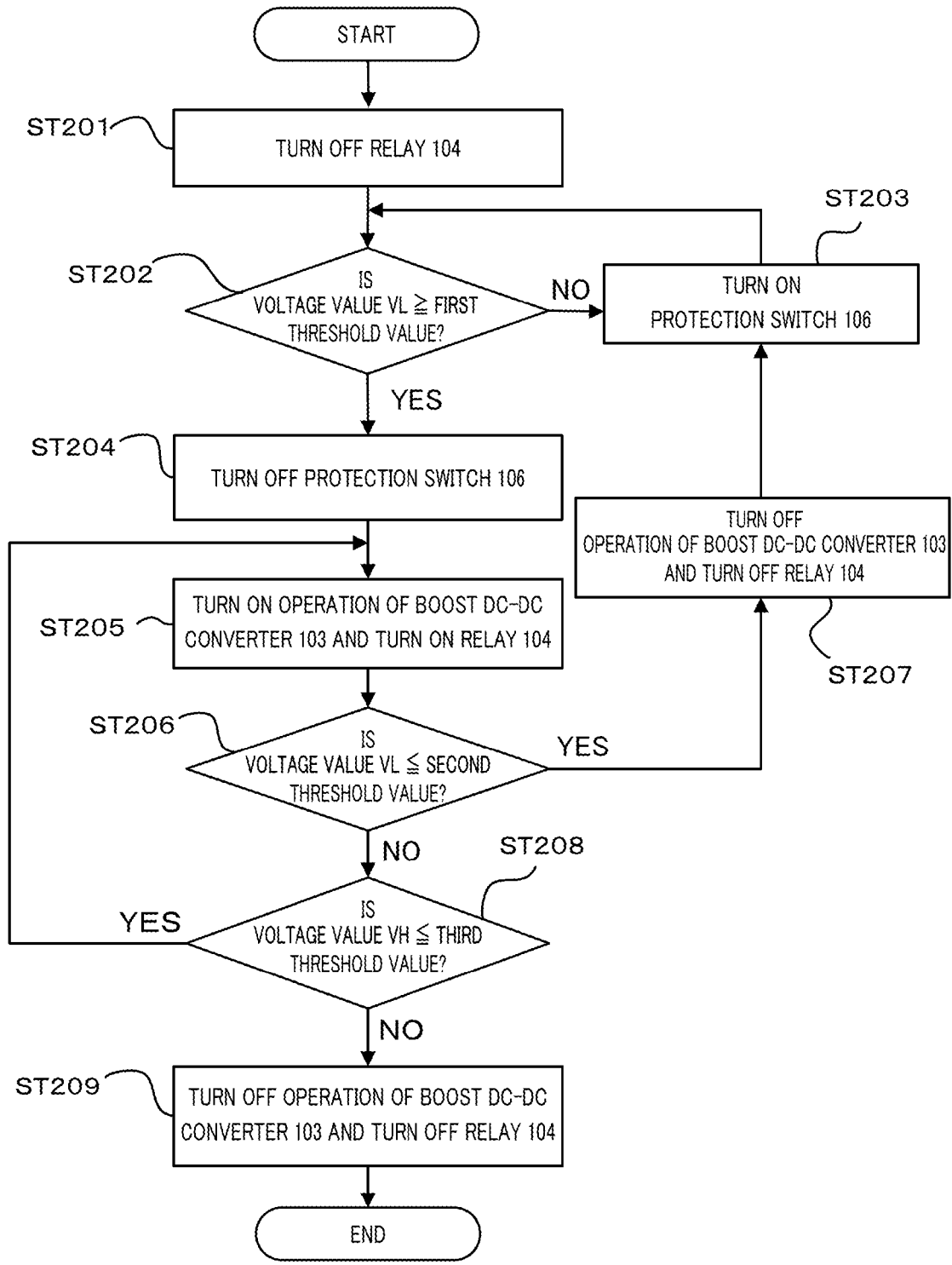
FIG. 2 is a flowchart illustrating an operation of the vehicle-mounted power source apparatus according to Embodiment 1 of the present invention while a vehicle stops.

An operation of vehicle-mounted power source apparatus 100 according to Embodiment 1 of the present invention while the vehicle stops will be described with reference to FIG. 2.

First, control section 109 determines that the vehicle is stopped, based on an ignition signal, and turns off relay 104 (step ST201).

Subsequently, control section 109 determines whether a voltage value VL of low voltage battery 107 is a first threshold value or greater (step ST202). Here, the voltage value VL indicates the amount of electrical power stored in low voltage battery 107, and increases as the amount of stored electrical power increases. The first threshold value is an upper limit value for the amount of electrical power stored in low voltage battery 107 and is a reference value to determine as to whether or not to stop charging low voltage battery 107.

When control section 109 determines that the voltage value VL is less than the first threshold value (step ST202: NO), control section 109 turns on protection switch 106 (step ST203), and the process returns to step ST202. Accordingly, vehicle-mounted power source apparatus 100 charges low voltage battery 107 prior to charging high voltage battery 105.

In contrast, when control section 109 determines that the voltage value VL is the first threshold value or greater (step ST202: YES), control section 109 turns off protection switch 106 (step ST204).

Subsequently, control section 109 turns on the operation of boost DC-DC converter 103 and relay 104 (step ST205). At this time, since a considerable amount of electrical power is stored in low voltage battery 107, vehicle-mounted power source apparatus 100 starts charging high voltage battery 105.

Control section 109 determines whether the voltage value VL is a second threshold value (the first threshold value>the second threshold value) or less (step ST206). Here, the second threshold value indicates a lower limit value for the amount of electrical power stored in low voltage battery 107, and is a reference value to determine as to whether or not to start charging low voltage battery 107.

When control section 109 determines that the voltage value VL is the second threshold value or less (step ST206: YES), control section 109 turns off the operation of boost DC-DC converter 103 and relay 104 (step ST207), and the process proceeds to step ST203. Accordingly, vehicle-mounted power source apparatus 100 starts charging low voltage battery 107. The second threshold value may not be the lower limit value but may be a value close to the first threshold value (the upper limit value). At this time, since the charging of low voltage battery 107 starts when the voltage value VL is less than the upper limit value, it is possible to preferentially charge low voltage battery 107 with better charge efficiency.

In contrast, when determining that the voltage value VL is greater than the second threshold value (step ST206: NO), control section 109 determines whether a voltage value VH of high voltage battery 105 is a third threshold value or less (step ST208). Here, the voltage value VH indicates the amount of electrical power stored in high voltage battery 105, and increases to the extent that the amount of stored electrical power is large. The third threshold value is an upper limit value for the amount of electrical power stored in high voltage battery 105, and is a reference value to determine as to whether or not to stop charging high voltage battery 105.

When control section 109 determines that the voltage value VH is the third threshold value or less (step ST208: YES), the process returns to step ST205. Accordingly, vehicle-mounted power source apparatus 100 continuously charges high voltage battery 105.

In contrast, when control section 109 determines that the voltage value VH is greater than the third threshold value (step ST208: NO), control section 109 turns off the operation of boost DC-DC converter 103 and relay 104 (step ST209), and ends a charging process.

<Operation of Vehicle-Mounted Power Source Apparatus while Vehicle Travels>

Figure 3:
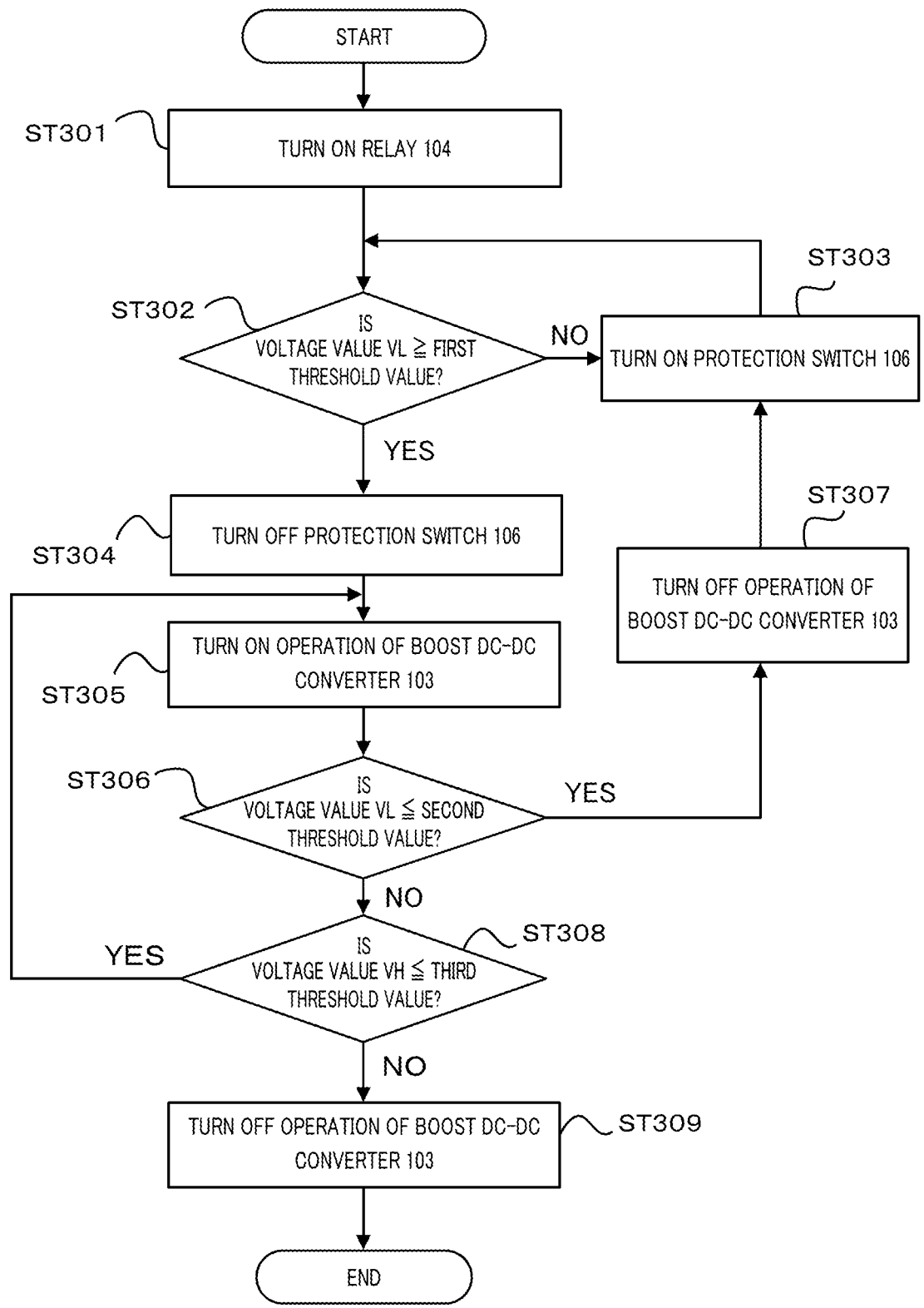
FIG. 3 is a flowchart illustrating an operation of the vehicle-mounted power source apparatus according to Embodiment 1 of the present invention while the vehicle travels.

An operation of vehicle-mounted power source apparatus 100 according to Embodiment 1 of the present invention while the vehicle travels will be described with reference to FIG. 3.

First, control section 109 determines that the vehicle is travelling, based on an ignition signal, and turns on relay 104 to output electrical power from high voltage battery 105 (step ST301).

Subsequently, control section 109 determines whether the voltage value VL of low voltage battery 107 is the first threshold value or greater (step ST302).

When determining that the voltage value VL is less than the first threshold value (step ST302: NO), control section 109 turns on protection switch 106 (step ST303), and the process returns to step ST302. Accordingly, vehicle-mounted power source apparatus 100 charges low voltage battery 107 prior to charging high voltage battery 105.

In contrast, when control section 109 determines that the voltage value VL is the first threshold value or greater (step ST302: YES), control section 109 turns off protection switch 106 (step ST304).

Subsequently, control section 109 turns on the operation of boost DC-DC converter 103 (step ST305). At this time, since a sufficient amount of electrical power is stored in low voltage battery 107, vehicle-mounted power source apparatus 100 starts charging high voltage battery 105.

Subsequently, control section 109 determines whether the voltage value VL is the second threshold value (the first threshold value>the second threshold value) or less (step ST306).

When control section 109 determines that the voltage value VL is the second threshold value or less (step ST306: YES), control section 109 turns off the operation of boost DC-DC converter 103 (step ST307), and the process proceeds to step ST303. Accordingly, vehicle-mounted power source apparatus 100 starts charging low voltage battery 107.

In contrast, when determining that the voltage value VL is greater than the second threshold value (step ST306: NO), control section 109 determines whether the voltage value VH of high voltage battery 105 is the third threshold value or less (step ST308).

When determining that the voltage value VH is the third threshold value or less (step ST308: YES), the process returns to step ST305. Accordingly, vehicle-mounted power source apparatus 100 continuously charges high voltage battery 105.

In contrast, when determining that the voltage value VH is greater than the third threshold value (step ST308: NO), control section 109 turns off the operation of boost DC-DC converter 103 (step ST309), and ends the charging process.

<Effects of Embodiment 1>

In the embodiment, when both of low voltage battery 107 and high voltage battery 105 are charged with electrical power obtained by solar power generation, switching is performed so that high voltage battery 105 is charged after low voltage battery 107 that requires no boosting (good charge efficiency) is charged. As a result, it is possible to prevent a decrease in the overall charge efficiency of the apparatus.

In the embodiment, since both of low voltage battery 107 and high voltage battery 105 are charged with electrical power obtained by solar power generation, it is possible to reliably supply electrical power to load 108 and also to increase the cruising distance of the vehicle and to reduce the charging time of high voltage battery 105.

(Embodiment 2)

In this embodiment, while the vehicle travels, low voltage battery 107 is charged after high voltage battery 105 is charged. That is, in a case where high voltage battery 105 is charged while the vehicle stops, it is necessary to turn on relay 104 and to start up a peripheral device for charging, for example, thus consuming electrical power. In contrast, in a case where high voltage battery 105 is charged while the vehicle travels, since relay 104 has already been turned on, and the peripheral device has already been started, it is not necessary to turn on relay 104 or to start up the peripheral device for charging, thus making it possible to prevent a decrease in charge efficiency compared to the case where high voltage battery 105 is charged while the vehicle stops. In the embodiment, taking this factor into consideration, high voltage battery 105 is preferentially charged while the vehicle travels.

In the embodiment, since the vehicle-mounted power source apparatus has the same configuration as in FIG. 1, the configuration will not be repeatedly described, and an operation of the vehicle-mounted power source apparatus while the vehicle travels will be described using the reference numerals illustrated in FIG. 1. In the embodiment, since an operation of the vehicle-mounted power source apparatus while the vehicle stops is the same as in FIG. 2, the description of the operation will not be given.

<Operation of Vehicle-Mounted Power Source Apparatus while Vehicle Travels>

Figure 4:
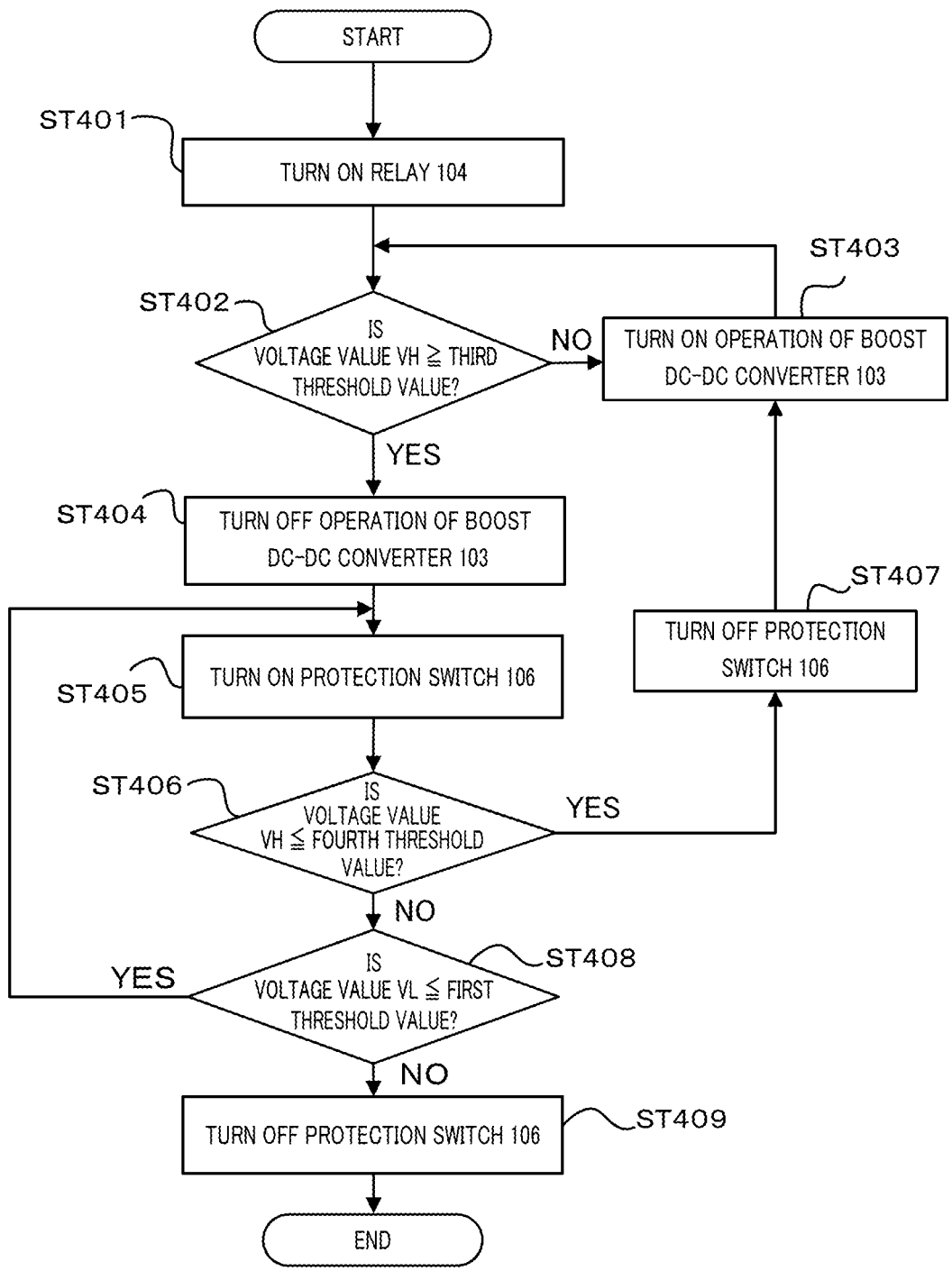
FIG. 4 is a flowchart illustrating an operation of the vehicle-mounted power source apparatus according to Embodiment 2 of the present invention while a vehicle travels.

An operation of vehicle-mounted power source apparatus 100 according to Embodiment 2 of the present invention while the vehicle travels will be described with reference to FIG. 4.

First, control section 109 determines that the vehicle is travelling, based on an ignition signal, and turns on relay 104 to output electrical power from high voltage battery 105 (step ST401).

Subsequently, control section 109 determines whether the voltage value VH of high voltage battery 105 is the third threshold value or greater (step ST402).

When determining that the voltage value VH is less than the third threshold value (step ST402: NO), control section 109 turns on the operation of boost DC-DC converter 103 (step ST403), and the process returns to step ST402. Accordingly, vehicle-mounted power source apparatus 100 charges high voltage battery 105 prior to charging low voltage battery 107.

In contrast, when determining that the voltage value VH is the third threshold value or greater (step ST402: YES), control section 109 turns off the operation of boost DC-DC converter 103 (step ST404). Accordingly, vehicle-mounted power source apparatus 100 stops charging high voltage battery 105.

Control section 109 turns on protection switch 106 (step ST405). At this time, since a sufficient amount of electrical power is stored in high voltage battery 105, vehicle-mounted power source apparatus 100 starts charging low voltage battery 107.

Control section 109 determines whether the voltage value VH is a fourth threshold value (the fourth threshold value<the third threshold value) or less (step ST406). Here, the fourth threshold value is a lower limit value for the amount of electrical power stored in high voltage battery 105, and is a reference value to determine as to whether or not to start charging high voltage battery 105.

When determining that the voltage value VH is the fourth threshold value or less (step ST406: YES), control section 109 turns off protection switch 106 (step ST407), and the process returns to step ST403. Accordingly, vehicle-mounted power source apparatus 100 starts charging high voltage battery 105. The fourth threshold value may not be the lower limit value but may be a value close to the third threshold value (the upper limit value). At this time, since the charging of high voltage battery 105 starts when the voltage value VH is less than the upper limit value, it is possible to preferentially charge high voltage battery 105.

In contrast, when determining that the voltage value VH is greater than the fourth threshold value (step ST406: NO), control section 109 determines whether the voltage value VL of low voltage battery 107 is the first threshold value or less (step ST408).

When control section 109 determines that the voltage value VL is the first threshold value or less (step ST408: YES), the process returns to step ST405. Accordingly, vehicle-mounted power source apparatus 100 continuously charges low voltage battery 107.

In contrast, when control section 109 determines that the voltage value VL is greater than the first threshold value (step ST408: NO), control section 109 turns off protection switch 106 (step ST409), and ends a charging process.

<Effects of Embodiment 2>

In the present embodiment, when both of low voltage battery 107 and high voltage battery 105 are charged with electrical power obtained by solar power generation, switching is performed so that high voltage battery 105 is charged after low voltage battery 107 that requires no boosting (good charge efficiency) is charged. As a result, it is possible to prevent a decrease in the overall charge efficiency of the apparatus.

In the present embodiment, since high voltage battery 105 is preferentially charged while the vehicle travels, it is possible to charge high voltage battery 105 while preventing a decrease in charge efficiency, and to increase the cruising distance of the vehicle compared to the case where high voltage battery 105 is charged while the vehicle stops.

In addition, in the embodiment, since both of low voltage battery 107 and high voltage battery 105 are charged with electrical power obtained by solar power generation, it is possible to reliably supply electrical power to load 108, and also to increase the cruising distance of the vehicle and to reduce the charging time of high voltage battery 105.

(Embodiment 3)

In this embodiment, after low voltage battery 107 is charged, low voltage battery 503 is charged, and then high voltage battery 105 is charged with electrical power stored in low voltage battery 503. That is, there is a problem in that it is necessary to turn on relay 104 and to start up boost DC-DC converter 504 when high voltage battery 105 is charged, thus consuming electrical power. In the embodiment, in order to solve this problem, low voltage battery 503 is charged, and high voltage battery 105 is charged from low voltage battery 503 when low voltage battery 503 stores a predetermined amount of electrical power or higher, and thereby it is possible to reduce an ON time of relay 104 and a start-up time of boost DC-DC converter 504, and to prevent a decrease in charge efficiency (power consumption during charging).

<Configuration of Vehicle-Mounted Power Source Apparatus>

The configuration of a vehicle-mounted power source apparatus 500 according to Embodiment 3 of the present invention will be described with reference to FIG. 5. In regard to input and output lines in FIG. 5, dotted lines each indicate an input and output line for the transmission of a control signal, and solid lines each indicate an input and output line for the transmission of signals other than the control signal or the delivery of electrical power.

Figure 5:
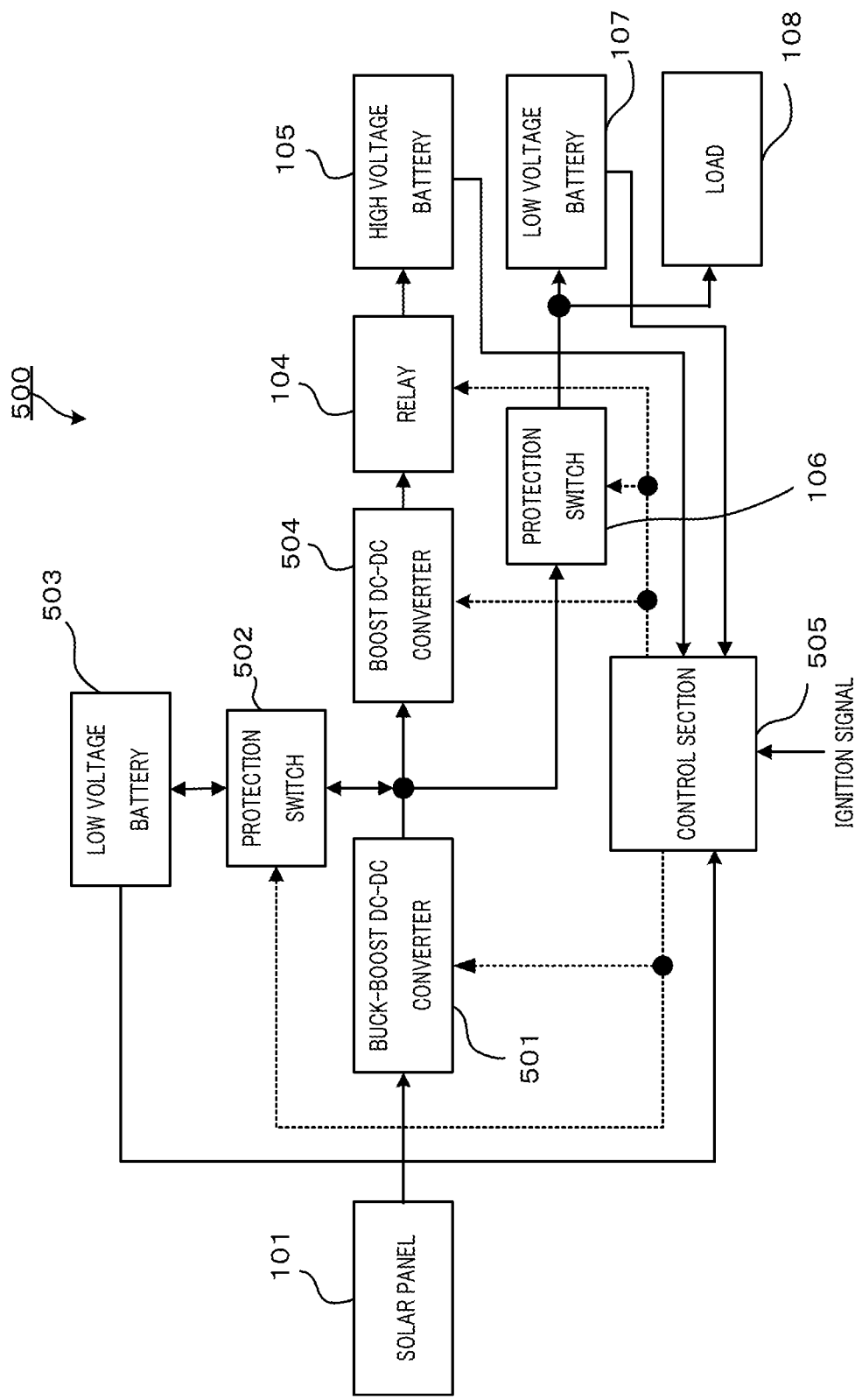
FIG. 5 is a block diagram illustrating the configuration of a vehicle-mounted power source apparatus according to Embodiment 3 of the present invention.

Compared to the configuration of vehicle-mounted power source apparatus 100 according to Embodiment 1 illustrated in FIG. 1, vehicle-mounted power source apparatus 500 illustrated in FIG. 5 has protection switch 502 and low voltage battery 503 as additional configuration elements, and has buck-boost DC-DC converter 501 in place of buck-boost DC-DC converter 102, boost DC-DC converter 504 in place of boost DC-DC converter 103, and control section 505 in place of control section 109. In FIG. 5, the same reference numerals are assigned to portions having the same configurations as in FIG. 1, and description thereof will be omitted.

Vehicle-mounted power source apparatus 500 is configured to mainly include solar panel 101; relay 104; high voltage battery 105; protection switch 106; low voltage battery 107; load 108; buck-boost DC-DC converter 501; protection switch 502; low voltage battery 503; boost DC-DC converter 504; and control section 505.

Buck-boost DC-DC converter 501 stabilizes a voltage value of output electrical power by boosting or bucking the voltage of electrical power from solar panel 101 according to the control by control section 505. Buck-boost DC-DC converter 501 outputs electrical power having a stabilized voltage value to protection switch 106, protection switch 502, and boost DC-DC converter 504.

Protection switch 502 switches between ON and OFF states according to the control by control section 505. Protection switch 502 switches between the following two patterns according to the control by control section 505. In a first pattern, when protection switch 502 is turned on, electrical power from buck-boost DC-DC converter 501 is output to low voltage battery 503, and in contrast, when protection switch 502 is turned off, electrical power from buck-boost DC-DC converter 501 is not output to low voltage battery 503. In a second pattern, when protection switch 502 is turned on, electrical power from low voltage battery 503 is output to boost DC-DC converter 504, and in contrast, when protection switch 502 is turned off, electrical power from low voltage battery 503 is not output to boost DC-DC converter 504.

Low voltage battery 503 stores the low-voltage electrical power that is input from buck-boost DC-DC converter 501 via protection switch 502.

Boost DC-DC converter 504 boosts the voltage of the electrical power from buck-boost DC-DC converter 501, or the voltage of the electrical power from protection switch 502 to a predetermined value according to the control by control section 505, and outputs the boosted electrical power to relay 104. At this time, a loss occurs in the electrical power boosted by boost DC-DC converter 504. When starting up, boost DC-DC converter 504 consumes electrical power.

Control section 505 controls buck-boost DC-DC converter 501 to switch between the turning on and off of a boost operation and a buck operation, and controls boost DC-DC converter 504 to switch between the turning on and off of a boost operation. Control section 505 monitors the amount of electrical power stored in low voltage battery 107, the amount of electrical power stored in high voltage battery 105, and the amount of electrical power stored in low voltage battery 503. Control section 505 charges low voltage battery 107, based on a monitoring result, and when the amount of electrical power stored in low voltage battery 107 is equal to or greater than a predetermined value, control section 505 charges low voltage battery 503. When the amount of electrical power stored in low voltage battery 503 is equal to or greater than a predetermined value, control section 505 controls relay 104, protection switch 106 and protection switch 502 to switch between ON and OFF states in such a manner that high voltage battery 105 is charged.

That is, first, control section 505 controls relay 104, protection switch 106, and protection switch 502 to switch between ON and OFF states in such a manner that electrical power from solar panel 101 is stored in low voltage battery 107 without being boosted by boost DC-DC converter 504, and low voltage battery 107 is charged. When the amount of electrical power stored in low voltage battery 107 is equal to or greater than the predetermined value, control section 505 controls relay 104, protection switch 106, and protection switch 502 to switch between ON and OFF states in such a manner that electrical power from solar panel 101 is stored in low voltage battery 503 without being boosted by boost DC-DC converter 504, and low voltage battery 503 is charged. When the amount of electrical power stored in low voltage battery 503 is equal to or greater than the predetermined value, control section 505 controls relay 104, protection switch 106, and protection switch 502 to switch between ON and OFF states in such a manner that high voltage battery 105 is charged. Accordingly, in vehicle-mounted power source apparatus 500, it is possible to immediately charge high voltage battery 105 from low voltage battery 503, to reduce a start-up time of boost DC-DC converter 504, relay 104, and the like, and to prevent a decrease in charge efficiency (electrical power consumption during charging). Here, the charging of low voltage battery 503 implies that low voltage battery 503 stores electrical power until the amount of electrical power stored therein reaches a predetermined value.

Control section 505 can determine whether the vehicle is travelling or is stopped, based on an ignition signal from the outside. Control section 505 determines an operation state of the vehicle based on an ignition signal in the same manner as performed by control section 109. Thus, a description using a specific example will not be given.

Relay 104 switches between ON and OFF states according to the control by control section 505. When relay 104 is turned on, the electrical power from boost DC-DC converter 504 is output to high voltage battery 105, and in contrast, when relay 104 is turned off, the electrical power from boost DC-DC converter 504 is not output to high voltage battery 105.

Protection switch 106 switches between ON and OFF states according to the control by control section 505. When protection switch 106 is turned on, the electrical power from buck-boost DC-DC converter 501 is output to low voltage battery 107, and in contrast, when protection switch 106 is turned off, the electrical power from buck-boost DC-DC converter 501 is not output to low voltage battery 107.

<Operation of Vehicle-Mounted Power Source Apparatus while Vehicle Stops>

An operation of vehicle-mounted power source apparatus 500 according to Embodiment 3 of the present invention while the vehicle stops will be described with reference to FIG. 6.

First, control section 505 determines that the vehicle is stopped, based on an ignition signal, and turns off protection switch 502 and the operation of boost DC-DC converter 504 (step ST601).

Subsequently, control section 505 determines whether the voltage value VL of low voltage battery 107 is the first threshold value or greater (step ST602).

When control section 505 determines that the voltage value VL is less than the first threshold value (step ST602: NO), control section 505 turns on protection switch 106 (step ST603), and the process returns to step ST602. Accordingly, vehicle-mounted power source apparatus 500 charges low voltage battery 107 prior to charging high voltage battery 105.

In contrast, when control section 505 determines that the voltage value VL is the first threshold value or greater (step ST602: YES), control section 505 turns off protection switch 106 and turns on protection switch 502 (step ST604). Accordingly, vehicle-mounted power source apparatus 500 charges low voltage battery 503 prior to charging high voltage battery 105.

Control section 505 determines whether the voltage value VL is the second threshold value or less (step ST605).

When determining that the voltage value VL is the second threshold value or less (step ST605: YES), control section 505 turns off protection switch 502 (step ST606), and the process returns to step ST603. Accordingly, vehicle-mounted power source apparatus 500 stops charging low voltage battery 503, and starts charging low voltage battery 107.

In contrast, when determining that the voltage value VL is greater than the second threshold value (step ST605: NO), control section 505 determines whether a voltage value VM of low voltage battery 503 is a fifth threshold value or greater (step ST607). Here, the voltage value VM indicates the amount of electrical power stored in low voltage battery 503, and increases as the amount of stored electrical power increases. The fifth threshold value indicates the amount of stored electrical power suitable for charging high voltage battery 105 (an upper limit value for the amount of electrical power stored in low voltage battery 503), and is a reference value to determine as to whether or not to stop charging low voltage battery 503.

When control section 505 determines that the voltage value VM is less than the fifth threshold value (step ST607: NO), the process returns to step ST604. Accordingly, vehicle-mounted power source apparatus 500 continuously charges low voltage battery 503.

In contrast, when control section 505 determines that the voltage value VM is the fifth threshold value or greater (step ST607: YES), control section 505 turns off buck-boost DC-DC converter 501 (step ST608). Accordingly, vehicle-mounted power source apparatus 500 stops charging low voltage battery 503.

Subsequently, control section 505 turns on the operation of boost DC-DC converter 504 and relay 104 (step ST609). Accordingly, vehicle-mounted power source apparatus 500 starts discharging low voltage battery 503, and starts charging high voltage battery 105.

Control section 505 determines whether the voltage value VM is a sixth threshold value (the fifth threshold value>the sixth threshold value) or less (step ST610). Here, the sixth threshold value indicates the amount of stored electrical power (for example, a lower limit value for the amount of electrical power stored in low voltage battery 503) suitable for confirming completion of the charging of high voltage battery 105, and is a reference value to determine as to whether or not to stop discharging low voltage battery 503, and a reference value to determine as to whether or not to stop charging high voltage battery 105.

When control section 505 determines that the voltage value VM is greater than the sixth threshold value (step ST610: NO), the process returns to step ST609. Accordingly, vehicle-mounted power source apparatus 500 continues to discharge low voltage battery 503 and to charge high voltage battery 105.

In contrast, when determining that the voltage value VM is the sixth threshold value or less (step ST610: YES), control section 505 turns off the operation of boost DC-DC converter 504 and relay 104 (step ST611). Accordingly, vehicle-mounted power source apparatus 500 stops discharging low voltage battery 503, and stops charging high voltage battery 105.

Subsequently, control section 505 turns on the operation of buck-boost DC-DC converter 501 (step ST612), and charges low voltage battery 503.

Figure 6:
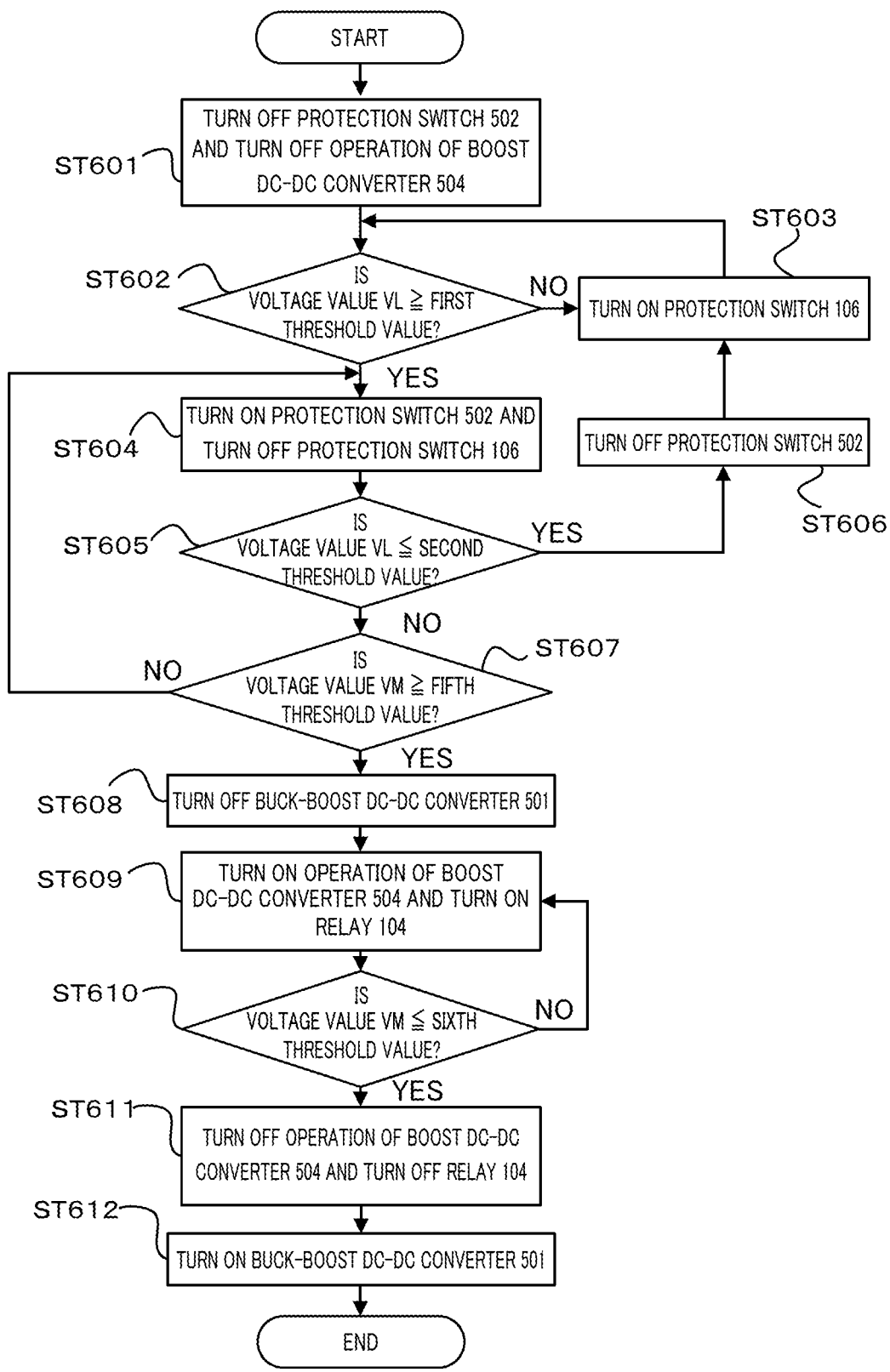
FIG. 6 is a flowchart illustrating an operation of the vehicle-mounted power source apparatus according to Embodiment 3 of the present invention while the vehicle stops.

The operation of vehicle-mounted power source apparatus 500 while the vehicle travels is the same as that illustrated in FIG. 6 except that relay 104 is turned on in a step following step ST601, and the controlling of relay 104 to be turned off in step ST611 is omitted, and thereby a description thereof will be omitted.

<Effects of Embodiment 3>

In the embodiment, when all of low voltage batteries 107 and 503, and high voltage battery 105 are charged with electrical power obtained by solar power generation, switching is performed so that high voltage battery 105 is charged after low voltage batteries 107 and 503 that require no boosting are charged. As a result, it is possible to prevent a decrease in the overall charge efficiency of the apparatus.

In the embodiment, since high voltage battery 105 is charged with electrical power stored in low voltage battery 503, it is possible to prevent a decrease in charge efficiency compared to when electrical power from solar panel 101 is boosted in each case, and high voltage battery 105 is charged with the boosted electrical power.

In the embodiment, since low voltage battery 107 is charged prior to low voltage battery 503, it is possible to reliably supply electrical power to load 108.

In addition, in the embodiment, since both of low voltage battery 107 and high voltage battery 105 are charged with electrical power obtained by solar power generation, it is possible to reliably supply electrical power to load 108 and also to increase the cruising distance of the vehicle and to reduce the charging time of high voltage battery 105.

<Variation of Embodiment 3>

In the embodiment, low voltage battery 107 is charged prior to high voltage battery 105 while the vehicle travels; however, high voltage battery 105 may be charged prior to low voltage battery 107.

(Embodiment 4)

In this embodiment, after low voltage battery 503 is charged, high voltage battery 105 is charged with electrical power stored in low voltage battery 503.

In the embodiment, since the vehicle-mounted power source apparatus has the same configuration as in FIG. 5, the configuration will not be repeatedly described, and an operation of the vehicle-mounted power source apparatus while the vehicle stops will be described using the reference numerals illustrated in FIG. 5.

<Operation of Vehicle-Mounted Power Source Apparatus while Vehicle Stops>

An operation of vehicle-mounted power source apparatus 500 according to Embodiment 4 of the present invention while the vehicle stops will be described with reference to FIG. 7.

First, control section 505 determines that the vehicle is stopped, based on an ignition signal, and turns off protection switch 106 and the operation of boost DC-DC converter 504 (step ST701).

Subsequently, control section 505 turns on protection switch 502 (step ST702). Accordingly, vehicle-mounted power source apparatus 500 charges low voltage battery 503 prior to charging high voltage battery 105.

Subsequently, control section 505 determines whether the voltage value VM of low voltage battery 503 is the fifth threshold value or greater (step ST703).

When control section 505 determines that the voltage value VM is less than the fifth threshold value (step ST703: NO), control section 505 repeats step ST703. Accordingly, vehicle-mounted power source apparatus 500 continuously charges low voltage battery 503.

In contrast, when control section 505 determines that the voltage value VM is the fifth threshold value or greater (step ST703: YES), control section 505 turns off buck-boost DC-DC converter 501 (step ST704). Accordingly, vehicle-mounted power source apparatus 500 stops charging low voltage battery 503.

Subsequently, control section 505 turns on the operation of boost DC-DC converter 504 and relay 104 (step ST705). Accordingly, vehicle-mounted power source apparatus 500 starts discharging low voltage battery 503 and starts charging high voltage battery 105.

Subsequently, control section 505 determines whether the voltage value VM is the sixth threshold value or less (step ST706).

When control section 505 determines that the voltage value VM is greater than the sixth threshold value (step ST706: NO), the process returns to step ST705. Accordingly, vehicle-mounted power source apparatus 500 continues to discharge low voltage battery 503 and to charge high voltage battery 105.

In contrast, when determining that the voltage value VM is the sixth threshold value or less (step ST706: YES), control section 505 turns off the operation of boost DC-DC converter 504 and relay 104 (step ST707). Accordingly, vehicle-mounted power source apparatus 500 stops discharging low voltage battery 503 and stops charging high voltage battery 105.

Subsequently, control section 505 turns on the operation of buck-boost DC-DC converter 501 (step ST708), and ends the charging process.

Figure 7:
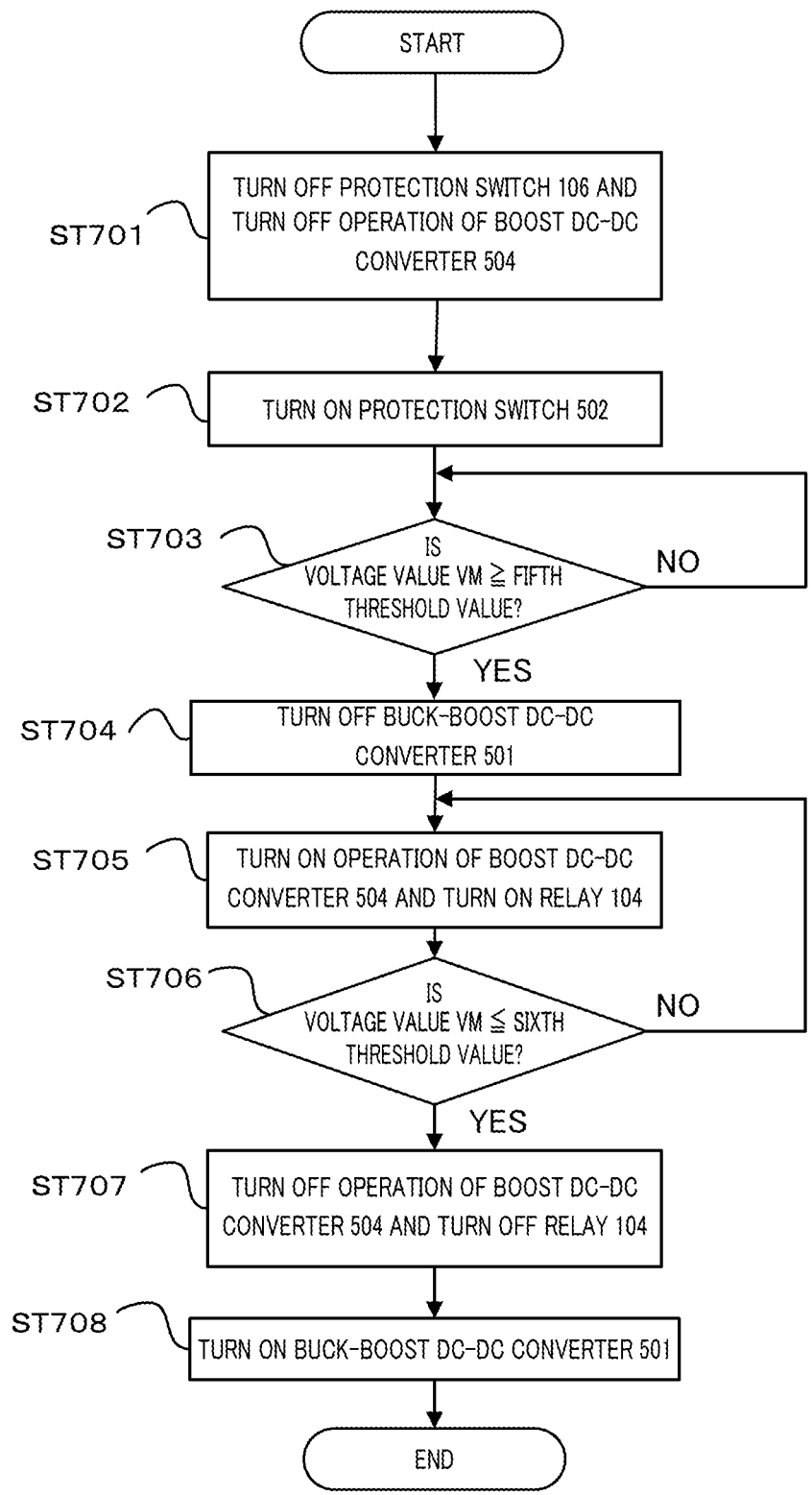
FIG. 7 is a flowchart illustrating an operation of the vehicle-mounted power source apparatus according to Embodiment 4 of the present invention while a vehicle stops.

When the amount of electrical power stored in low voltage battery 107 is the second threshold value (the reference value to determine as to whether or not to start charging low voltage battery 107) or less, preferably, control section 505 stops the operation illustrated in FIG. 7, and stores electrical power in low voltage battery 107.

The operation of vehicle-mounted power source apparatus 500 while the vehicle travels is the same as that illustrated in FIG. 7 except that relay 104 is turned on in a step following step ST701, and the controlling of relay 104 to be turned off in step ST707 is omitted, and thereby description thereof will be omitted.

<Effects of Embodiment 4>

In the present embodiment, when both of low voltage battery 503 and high voltage battery 105 are charged with the electrical power obtained by solar power generation, switching is performed so that high voltage battery 105 is charged after low voltage battery 503 that requires no boosting is charged. As a result, it is possible to prevent a decrease in the overall charge efficiency of the apparatus.

In the embodiment, since high voltage battery 105 is charged with electrical power stored in low voltage battery 503, it is possible to prevent a decrease in charge efficiency compared to when electrical power from solar panel 101 is boosted, and high voltage battery 105 is charged with the boosted electrical power.

<Variation of Embodiment 4>

In the embodiment, low voltage battery 503 is charged prior to high voltage battery 105 while the vehicle travels; however, high voltage battery 105 may be charged prior to low voltage battery 503.

(Embodiment 5)

This embodiment is characterized in that, when high voltage battery 105 is charged with electrical power stored in low voltage battery 803, the charging and the discharging of low voltage battery 803 are performed via different paths.

<Configuration of Vehicle-Mounted Power Source Apparatus>

The configuration of vehicle-mounted power source apparatus 800 according to Embodiment 5 of the present invention will be described with reference to FIG. 8. In regard to input and output lines in FIG. 8, dotted lines each indicate an input and output line for the transmission of a control signal, and solid lines each indicate an input and output line for the transmission of signals other than the control signal or the delivery of electrical power.

Figure 8:
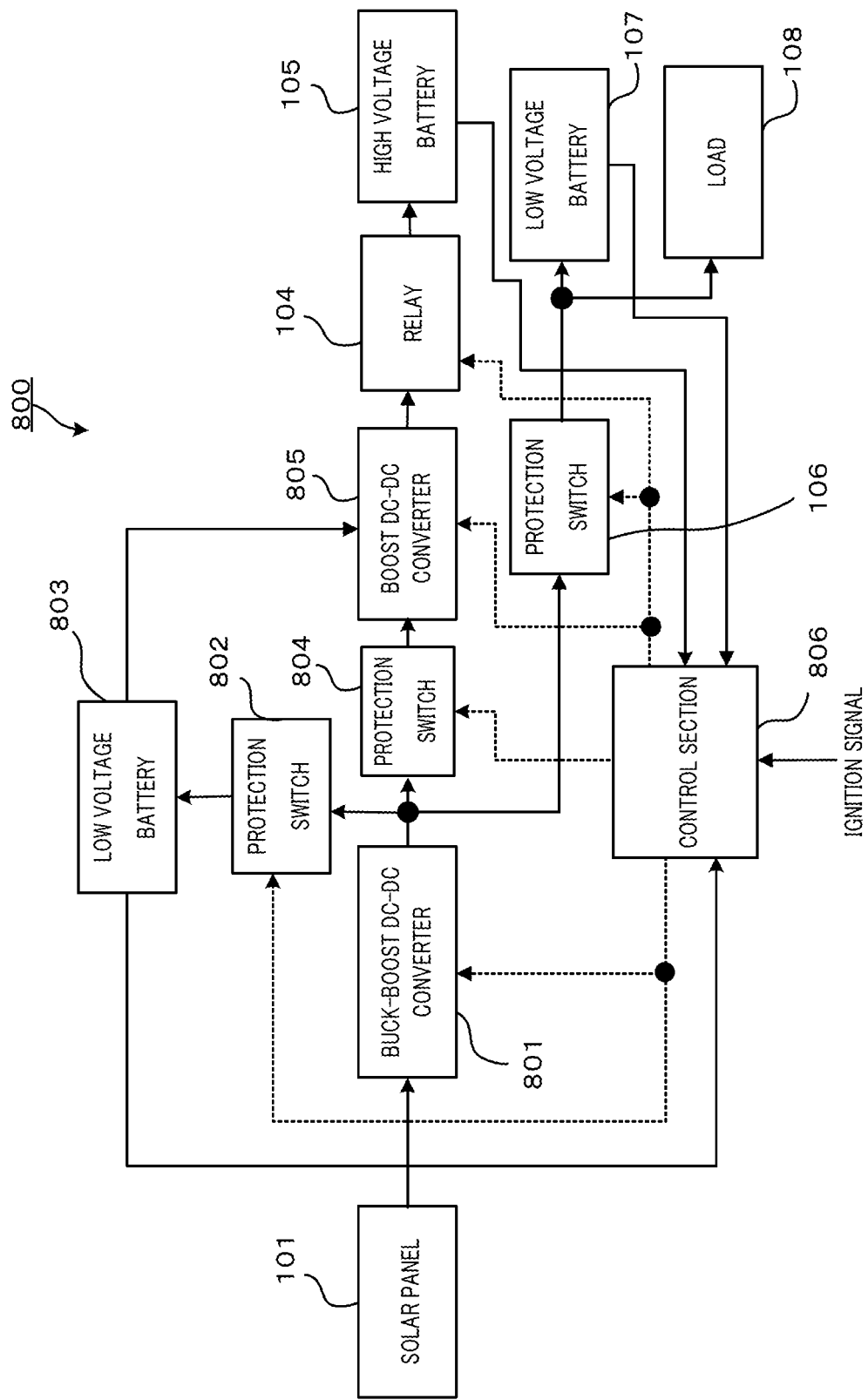
FIG. 8 is a block diagram illustrating the configuration of a vehicle-mounted power source apparatus according to Embodiment 5 of the present invention.

Compared to the configuration of vehicle-mounted power source apparatus 100 according to Embodiment 1 illustrated in FIG. 1, vehicle-mounted power source apparatus 800 illustrated in FIG. 8 has protection switch 802, low voltage battery 803, and protection switch 804 as additional configuration elements, and has buck-boost DC-DC converter 801 in place of buck-boost DC-DC converter 102, boost DC-DC converter 805 in place of boost DC-DC converter 103, and control section 806 in place of control section 109. In FIG. 8, the same reference numerals are assigned to portions having the same configurations as in FIG. 1, and description thereof will be omitted.

Vehicle-mounted power source apparatus 800 is configured to mainly include solar panel 101; relay 104; high voltage battery 105; protection switch 106; low voltage battery 107; load 108; buck-boost DC-DC converter 801; protection switch 802; low voltage battery 803; protection switch 804; boost DC-DC converter 805; and control section 806.

Buck-boost DC-DC converter 801 stabilizes a voltage value of output electrical power by boosting or bucking the voltage of electrical power from solar panel 101 according to the control by control section 806. Buck-boost DC-DC converter 801 outputs electrical power having a stabilized voltage value to protection switch 106, protection switch 802, and protection switch 804.

Protection switch 802 switches between ON and OFF states according to the control by control section 806. When protection switch 802 is turned on, the electrical power from buck-boost DC-DC converter 801 is output to low voltage battery 803, and in contrast, when protection switch 802 is turned off, the electrical power from buck-boost DC-DC converter 801 is not output to low voltage battery 803.

Low voltage battery 803 stores the low-voltage electrical power that is input from buck-boost DC-DC converter 801 via protection switch 802.

Protection switch 804 switches between ON and OFF states according to the control by control section 806. When protection switch 804 is turned on, the electrical power from buck-boost DC-DC converter 801 is output to boost DC-DC converter 805, and in contrast, when protection switch 804 is turned off, the electrical power from buck-boost DC-DC converter 801 is not output to boost DC-DC converter 805. Boost DC-DC converter 805 boosts the voltage of the electrical power that is input from buck-boost DC-DC converter 801 via protection switch 804, or the voltage of the electrical power acquired from low voltage battery 803 to a predetermined value according to the control by control section 806, and outputs the boosted electrical power to relay 104. At this time, a loss occurs in the electrical power boosted by boost DC-DC converter 805.

Control section 806 controls buck-boost DC-DC converter 801 to switch between the turning on and off of a boost operation and a buck operation, and controls boost DC-DC converter 805 to switch between the turning on and off of a boost operation. Control section 806 monitors the amount of electrical power stored in low voltage battery 107, the amount of electrical power stored in high voltage battery 105, and the amount of electrical power stored in low voltage battery 803. Control section 806 charges low voltage battery 803, based on a monitoring result, and when the amount of electrical power stored in low voltage battery 803 is equal to or greater than a predetermined value, control section 806 controls relay 104, protection switch 106, protection switch 802, and protection switch 804 to switch between ON and OFF states in such a manner that high voltage battery 105 is charged with electrical power stored in low voltage battery 803.

That is, first, control section 806 controls relay 104, protection switch 106, protection switch 802, and protection switch 804 to switch between ON and OFF states in such a manner that electrical power from solar panel 101 is stored in low voltage battery 803 without being boosted by boost DC-DC converter 805, and low voltage battery 803 is charged. When the amount of electrical power stored in low voltage battery 803 is equal to or greater than the predetermined value, control section 806 turns off protection switch 802 and protection switch 804 and turns on boost DC-DC converter 805 and relay 104 in such a manner that high voltage battery 105 is charged from low voltage battery 803. Accordingly, high voltage battery 105 is charged from low voltage battery 803 via boost DC-DC converter 805 and relay 104. At this time, protection switch 802 and protection switch 804 are turned off, and protection switch 106 is turned on, and thereby electrical power generated by solar panel 101 can be supplied to low voltage battery 107 and load 108 while high voltage battery 105 is charged from low voltage battery 803. Here, the charging of low voltage battery 803 implies that low voltage battery 803 stores electrical power until the amount of electrical power stored therein reaches a predetermined value.

Control section 806 can determine whether the vehicle is travelling or is stopped, based on an ignition signal from the outside. Control section 806 determines an operation state of the vehicle based on an ignition signal in the same manner as performed by control section 109, and thereby a description of a specific example will not be given.

Relay 104 switches between ON and OFF states according to the control by control section 806. When relay 104 is turned on, the electrical power from boost DC-DC converter 805 is output to high voltage battery 105, and in contrast, when relay 104 is turned off, the electrical power from boost DC-DC converter 805 is not output to high voltage battery 105.

Protection switch 106 switches between ON and OFF states according to the control by control section 806. When protection switch 106 is turned on, the electrical power from buck-boost DC-DC converter 801 is output to low voltage battery 107, and in contrast, when protection switch 106 is turned off, the electrical power from buck-boost DC-DC converter 801 is not output to low voltage battery 107.

<Effects of Embodiment 5>

In the embodiment, boost DC-DC converter 805 directly acquires electrical power stored in low voltage battery 803 without going through protection switch 802. Accordingly, in the embodiment, in addition to the effects of Embodiment 3, electrical power generated by solar panel 101 can be supplied to low voltage battery 107 and load 108 while high voltage battery 105 is charged from low voltage battery 803, and it is possible to efficiently use the generated electrical power, and to prevent a decrease in charge efficiency.

<Variation Common to all Embodiments>

In Embodiments 1 to 5, each battery is charged by storing electrical power until the amount of electrical power stored therein reaches a predetermined value; however, each battery may be charged by storing electrical power for a predetermined amount of time.

The disclosure of Japanese Patent Application No. 2012-252094, filed on Nov. 16, 2012, including the specification, drawings and abstract is incorporated herein by reference in its entirety.

INDUSTRIAL APPLICABILITY

The vehicle-mounted power source apparatus according to the present invention is suitable for storing electrical power obtained by solar power generation in a battery.

REFERENCE SIGNS LIST

100 Vehicle-mounted power source apparatus
101 Solar panel
102 Buck-boost DC-DC converter
103 Boost DC-DC converter
104 Relay
105 High voltage battery
106 Protection switch
107 Low voltage battery
108 Load
109 Control section

The invention claimed is:

1. A vehicle-mounted power source apparatus that charges a battery with electrical power obtained by solar power generation, the apparatus comprising:
   a low voltage battery;
   a high voltage battery that stores electrical power having a voltage higher than the low voltage battery;
   a solar panel that converts sunlight into electrical power;
   a buck-boost section that boosts or steps down the voltage of the electrical power obtained through the conversion by the solar panel;
   a boost section that boosts the voltage of the electrical power boosted or stepped down by the buck-boost section; and
   a control section that charges the low voltage battery with the electrical power boosted or stepped down by the buck-boost section, and that performs switching so as to charge the high voltage battery with the electrical power boosted by the boost section when the amount of electrical power stored in the low voltage battery is equal to or greater than a predetermined value.

2. The vehicle-mounted power source apparatus according to claim 1, wherein the control section performs the switching while a vehicle stops, and the control section charges, while the vehicle travels, the high voltage battery with the electrical power boosted by the boost section, and performs switching so as to charge the low voltage battery with the electrical power obtained through the conversion by the solar panel when the amount of electrical power stored in the high voltage battery is equal to or greater than a predetermined value.

3. The vehicle-mounted power source apparatus according to claim 1, wherein, when the amount of electrical power stored in the low voltage battery is equal to or greater than a predetermined value, the control section performs switching so as to cause the electrical power stored in the low voltage battery to be boosted by the boost section, and to charge the high voltage battery.

4. The vehicle-mounted power source apparatus according to claim 1, wherein
   the low voltage battery consists of a first low voltage battery and a second low voltage battery, the first low voltage battery being configured to supply the stored electric power to a load, and
   the control section performs switching so as to cause the electrical power stored in the second low voltage battery to be boosted by the boost section, and to charge the high voltage battery when the amount of electrical power stored in the second low voltage battery is equal to or greater than a predetermined value, and the control section performs switching so as to charge the first low voltage battery with the electrical power boosted or stepped down by the buck-boost section, while the switching that causes the electrical power stored in the second low voltage battery to be boosted by the boost section and that charges the high voltage battery is performed.

5. The vehicle-mounted power source apparatus according to claim 4, further comprising protection switches that are respectively provided between the buck-boost section and the first low voltage battery, between the buck-boost section and the second low voltage battery, and between the buck-boost section and the boost section, wherein the boost section acquires electrical power stored in the low voltage battery not via the protection switches.

6. The vehicle-mounted power source apparatus according to claim 5, wherein the control section charges the first low voltage battery with the electrical power boosted or stepped down by the buck-boost section, and performs switching so as to charge the second low voltage battery with the electrical power boosted or stepped down by the buck-boost section, when the amount of electrical power stored in the first low voltage battery is equal to or greater than a predetermined value.

* * * * *